(12) United States Patent
Littell

(10) Patent No.: US 9,452,491 B1
(45) Date of Patent: Sep. 27, 2016

(54) FRICTION PULL PLUG AND MATERIAL CONFIGURATION FOR ANTI-CHATTER FRICTION PULL PLUG WELD

(71) Applicant: The United States of America as represented by the Administrator of the National Aeronautics and Space Administration, Washington, DC (US)

(72) Inventor: Justin Anderson Littell, Huntsville, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/971,665

(22) Filed: Dec. 16, 2015

(51) Int. Cl.
*B23K 20/12* (2006.01)
*F16L 55/11* (2006.01)
*F16L 55/13* (2006.01)

(52) U.S. Cl.
CPC ....... *B23K 20/1255* (2013.01); *B23K 20/1295* (2013.01); *F16L 55/11* (2013.01); *F16L 55/13* (2013.01)

(58) Field of Classification Search
CPC B23K 20/129; B23K 20/1295; B23K 20/12; B23K 20/1255; F16L 55/13; F16L 55/11; F16L 55/1116; F16L 55/1125; Y10T 29/49956
See application file for complete search history.

(56) References Cited

U.S. PATENT DOCUMENTS

| | | | |
|---|---|---|---|
| 6,230,958 B1 | 5/2001 | Coletta et al. | |
| 6,253,987 B1 | 7/2001 | Coletta et al. | |
| 6,386,419 B2 | 5/2002 | Coletta et al. | |
| 6,460,750 B1 | 10/2002 | Coletta et al. | |
| 6,880,743 B1 | 4/2005 | Coletta et al. | |
| D655,998 S * | 3/2012 | Malone | D8/349 |
| 2014/0093324 A1* | 4/2014 | Makino | F16B 19/1063 411/43 |

* cited by examiner

*Primary Examiner* — Erin Saad
(74) *Attorney, Agent, or Firm* — Peter J. Van Bergen; James J. McGroary

(57) ABSTRACT

A friction pull plug is provided for use in forming a plug weld in a hole in a material. The friction pull plug includes a shank and a series of three frustoconical sections. The relative sizes of the sections assure that a central one of the sections defines the initial contact point between the hole's sides. The angle defined by the central one of the sections reduces or eliminates chatter as the plug is pulled into the hole.

6 Claims, 2 Drawing Sheets

Figure 1:
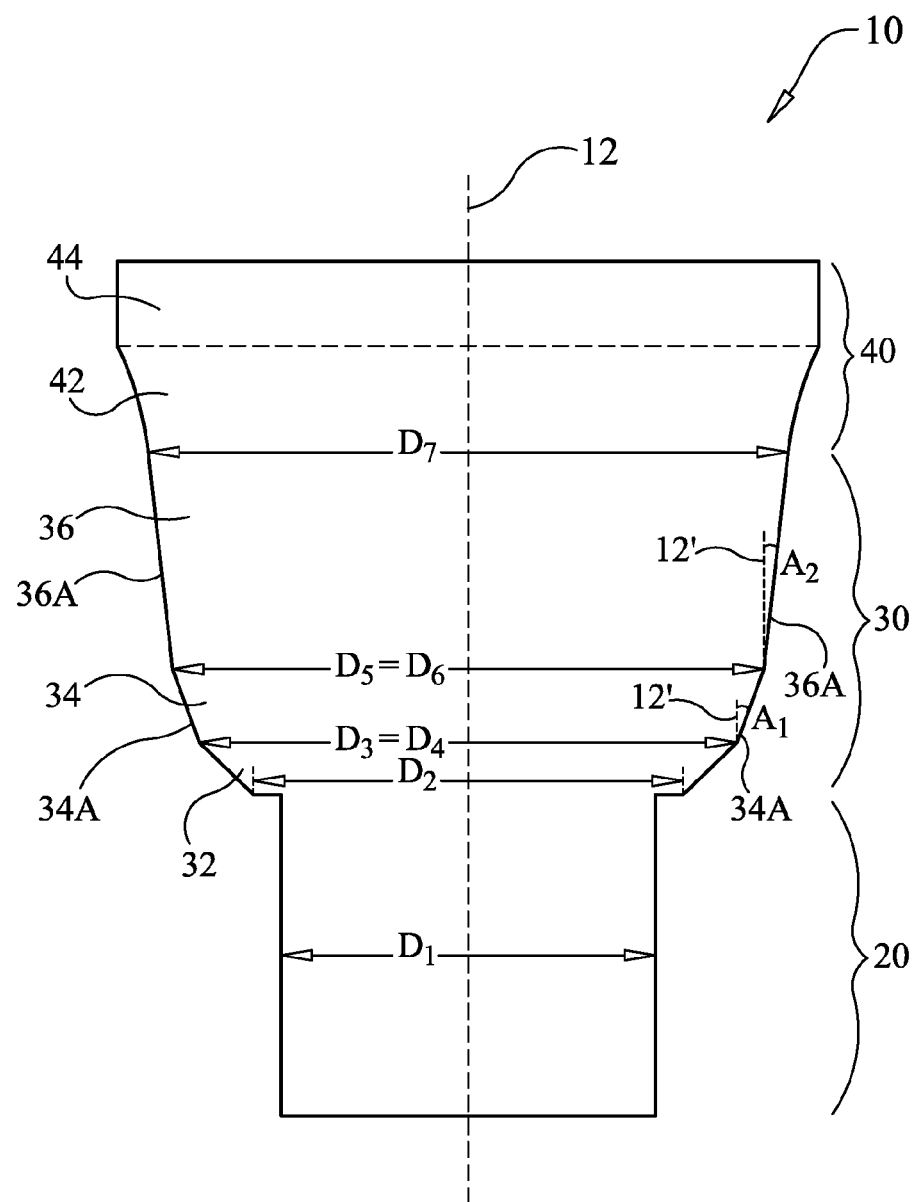

FRICTION PULL PLUG AND MATERIAL CONFIGURATION FOR ANTI-CHATTER FRICTION PULL PLUG WELD

ORIGIN OF THE INVENTION

The invention described herein was made by an employee of the United States Government and may be manufactured and used by or for the Government of the United States of America for governmental purposes without the payment of any royalties thereon or therefore.

BACKGROUND OF THE INVENTION

1. Field of the Invention

This invention relates to plugs used in friction pull plug welding. More specifically, the invention is friction pull plug whose lateral surfaces are configured to reduce or eliminate chatter when the plug contacts a material's hole during a friction pull plug welding process.

2. Description of the Related Art

Friction pull plug welding involves locating a defective weld, removing the defect to form a hole in a material, and filling the hole with a tapered plug that is friction welded into place. In general, a friction pull plug is rotated at high speeds, e.g., typically several thousand revolutions per minute. As the rotating plug comes into contact with a material's hole that is to be plugged, tremendous torque and loads are required to maintain the rotational speed of the plug. Any chatter developed during this stage of the process can produce torque that stalls the machine rotating the plug or causes speed fluctuations that can cause variations in the weld's strength. These problems are exacerbated when a plug's taper angle is decreased as is generally the case with increasing material thickness.

SUMMARY OF THE INVENTION

Accordingly, it is an object of the present invention to provide a friction pull plug that reduces chatter as the plug contacts a hole's side walls.

Another object of the present invention is to provide a friction pull plug that can be used to effectively plug holes in both thin and thick materials.

Other objects and advantages of the present invention will become more obvious hereinafter in the specification and drawings.

In accordance with the present invention, a friction pull plug is provided for use in forming a plug weld in a hole in a material wherein the hole has a diameter D. The friction pull plug includes a shank having a constant diameter $D_1$ wherein $D_1 < D$. A first inverted frustoconical section is coupled to the shank. The first inverted frustoconical section has a smallest diameter $D_2$ wherein $D_2 < D$, and has a largest diameter $D_3$ wherein $D_3 > D_2$ and $D_3 < D$. A second inverted frustoconical section is coupled to the first inverted frustoconical section. The second frustoconical section has a smallest diameter $D_4$ wherein $D_4 = D_3$, and has a largest diameter $D_5$ wherein $D_5 > D$. The second inverted frustoconical section has a first longitudinal axis and a first lateral surface wherein a first angle defined between the first longitudinal axis and the first lateral surface is between approximately 7.5° and approximately 22.5°. A third inverted frustoconical section is coupled to the second inverted frustoconical section. The third inverted frustoconical section has a smallest diameter $D_6$ wherein $D_6 = D_5$, and has a largest diameter $D_7$ wherein $D_7 > D_6$. The third inverted frustoconical section has a second longitudinal axis and a second lateral surface wherein a second angle defined between the second longitudinal axis and the second lateral surface is less than the first angle and is between approximately 5° and approximately 7.5°.

BRIEF DESCRIPTION OF THE DRAWING(S)

Figure 2:
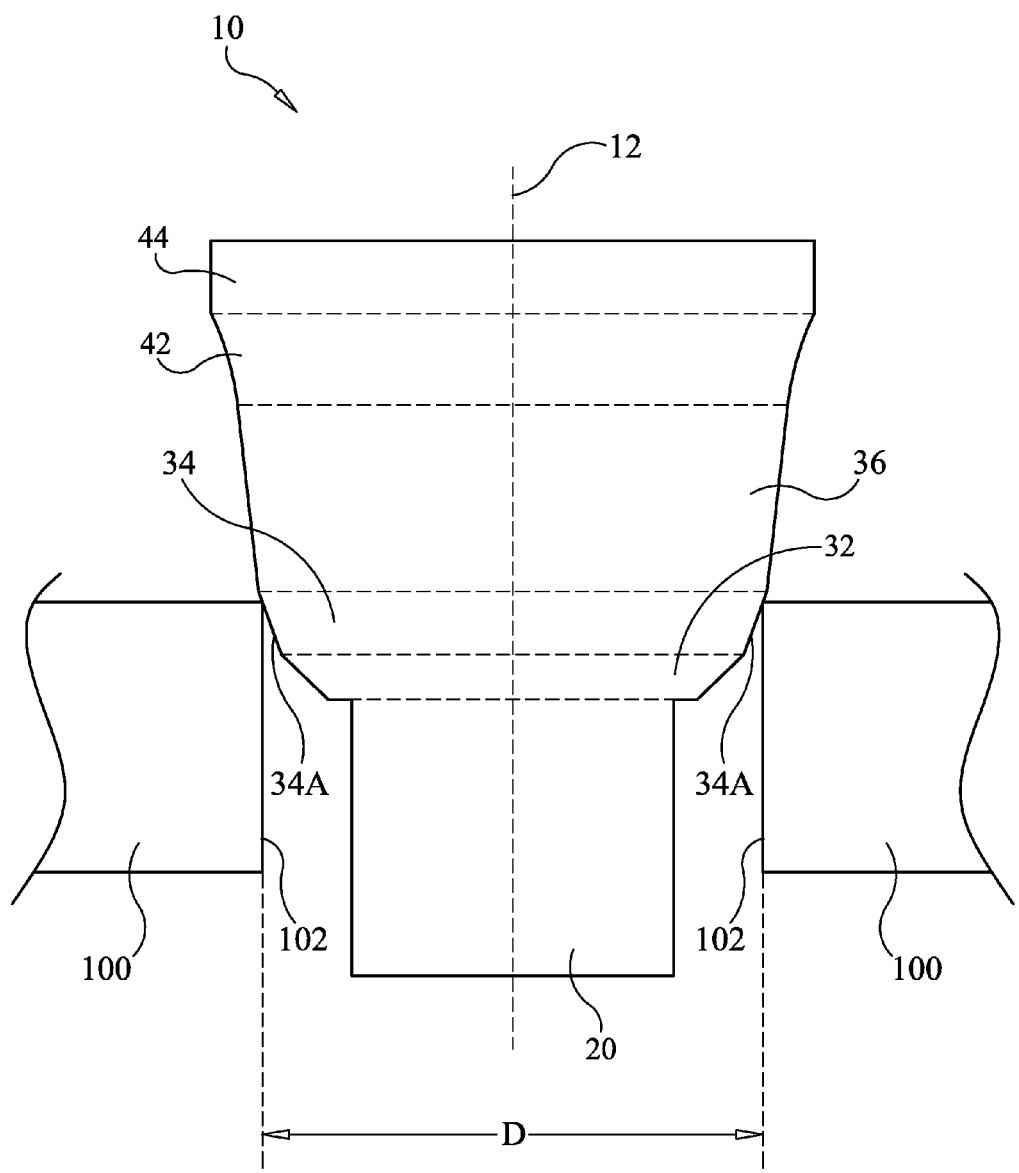

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is aside view of a friction pull plug in accordance with an embodiment of the present invention; and FIG. 2 is a side view of the friction pull plug at its initial point of contact with the side walls of a hole to be plugged.

DESCRIPTION OF THE PREFERRED EMBODIMENT(S)

Referring now to the drawings and more particularly to FIG. 1, a friction pull plug (FPP) in accordance with an embodiment of the present invention is shown and is referenced generally by numeral 10. As is well known in the art and as will be explained later below, FPP 10 will be rotated about its longitudinal axis 12 at very high speeds as FPP 10 is pulled along longitudinal axis 12 into a hole that is to be plug welded. As will be explained further below, FPP 10 includes lateral surface angles that reduce or eliminate chatter as FPP 10 contacts a hole to be plugged.

FPP 10 includes a lower region or shank 20, a middle region 30 of frustoconical sections coupled on the longitudinal end thereof to one end of shank 20, and a top region 40 coupled on one end thereof to the opposing longitudinal end of region 30. Top region 40 includes a region 42 forming the uppermost portion of a weld and a region 44 forming the portion of FPP 10 that is not drawn into a material's hole to be plugged. However, top region 40 does not form part of the present invention and will not be discussed further herein. As mentioned above, all three regions 20, 30 and 40 share a common longitudinal axis 12. Regions 20, 30 and 40 can be a one-piece integrated structure.

Lower region or shank 20 is generally a cylindrical element having a constant diameter illustrated and referenced hereinafter as diameter $D_1$. As is known in the art, shank 20 is the portion of FPP 10 that is engaged by a portion of a tool/machine (not shown) that will rotate FPP 10 at high speeds during a friction pull plug welding process.

Middle region 30 defines a series of frustoconical sections aligned along longitudinal axis 12. Briefly, middle region 30 is a series of three inverted frustoconical sections 32, 34 and 36 where the sections are inverted relative to shank 20. Frustoconical section 32 is adjacent to shank 20, frustoconical section 34 is adjacent to section 32, and frustoconical section 36 is adjacent to section 34. The smallest diameter of section 32 is referenced as $D_2$, and the largest diameter of section 32 is referenced as $D_3$. The smallest diameter section 34 is referenced as $D_4$, and the largest diameter of section 34 is referenced ad $D_5$. Finally, the smallest diameter of section 36 is referenced as $D_6$, and the largest diameter of section 36 is referenced as $D_7$. The relationship between the various diameters will be explained later below.

The lateral surface angles of sections 34 and 36 allow FPP 10 to reduce or eliminate chatter during a friction pull plug weld process. Each of lateral surface angles $A_1$ and $A_2$ of sections 34 and 36, respectively, is defined as the angle made between longitudinal axis 12 (indicated by dashed line 12' that is parallel to longitudinal axis 12) and the lateral surfaces 34A and 36A of sections 34 and 36, respectively. As will be explained further below, lateral surface 34A serves as the initial contact with a material's hole as FPP 10 is drawn therein, and lateral surface 36A serves as a major portion of the weld region of FPP 10 with the sides of the material's hole. In general, lateral surface angle $A_1$ is an angle between approximately 7.5° and approximately 22.5°. Lateral surface angle $A_2$ is an angle that is less than angle $A_1$ and is between approximately 5° and approximately 7.5°. In tests of the present invention for material thicknesses on the order of 0.5 inches to 0.625 inches, and plug rotation speeds on the order of 5000 to 6500 RPM, no chatter resulted when angle $A_1$ was approximately 20° and angle $A_2$ was approximately 6.5°. Changes in angles $A_1$ and $A_2$ can be affected by materials used, stroke rates, material thickness, plug rotation speeds, etc.

Referring additionally now to FIG. 2, a side view of FPP 10 is illustrated where horizontal dashed lines have been added to facilitate delineation between the various sections of FPP 10. In accordance with the present invention, lateral surface 34A of FPP 10 first makes contact with a hole 102 in a material 100 at points on lateral surface 34A. That is, FPP 10 at its initial contact point between hole 102 and lateral surface 34A defines a diameter that is between $D_4$ (or the smallest diameter of section 34) and $D_5$ (or the largest diameter of section 34). Hole 102 has a diameter D. The various diameter relationships for FPP 10 are as follows:

$D_1 < D$ $D_2 < D$ $D_3 > D_2$ and $D_3 < D$ $D_4 = D_3$ $D_5 > D$ $D_6 = D_5$ $D_7 > D_6$ In accordance with these relationships, the initial contact point of FPP 10 with hole 102 occurs along lateral surface 34A having lateral surface angle $A_1$ as described above.

The advantages of the present invention are numerous. The friction pull plug of the present invention reduces or eliminates chatter during a friction pull plug welding process. The plug as described herein is suitable for use in thin and thicker materials. By reducing or eliminating chatter, the ultimate weld region will be consistent as the plug is properly seated during the weld process.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A friction pull plug and material configuration for an anti-chatter friction pull plug weld, comprising:
   a material having a hole therein wherein said hole has a diameter D; and
   a friction pull plug including
   a shank having a constant diameter $D_1$ wherein $D_1 < D$,
   a first inverted frustoconical section coupled directly to said shank, said first inverted frustoconical section having a smallest diameter $D_2$ wherein $D_2 < D$, said first inverted frustoconical section having a largest diameter $D_3$ wherein $D_3 > D_2$ and $D_3 < D$,
   a second inverted frustoconical section coupled directly to said first inverted frustoconical section, said second frustoconical section having a smallest diameter $D_4$ wherein $D_4 = D_3$, said second inverted frustoconical section having a largest diameter $D_5$ wherein $D_5 > D$, said second inverted frustoconical section having a longitudinal axis and a first lateral surface wherein a first angle defined between said longitudinal axis and said first lateral surface is between approximately 7.5° and approximately 22.5°, and
   a third inverted frustoconical section coupled directly to said second inverted frustoconical section, said third inverted frustoconical section having a smallest diameter $D_6$ wherein $D_6 = D_5$, said third inverted frustoconical section having a largest diameter $D_7$ wherein $D_7 > D_6$, said third inverted frustoconical section having a second lateral surface wherein a second angle defined between said longitudinal axis and said second lateral surface is less than said first angle and is between approximately 5° and approximately 7.5°,
   wherein, when said friction pull plug is positioned with said first frustoconical section and a portion of said second frustoconical section in said hole, said first lateral surface area contacts said material at said hole.

2. A friction pull plug and material configuration as in claim 1, wherein said first angle is approximately 20° and wherein said second angle is approximately 6.5°.

3. A friction pull plug and material configuration for an anti-chatter friction pull plug weld, comprising:
   a material having a hole therein wherein said hole has a diameter D;
   a one-piece plug structure having a longitudinal axis, said plug structure including a shank and a series of three frustoconical sections;
   said shank having a constant diameter $D_1$ wherein $D_1 < D$;
   said series of three frustoconical sections having a first frustoconical section directly adjacent to said shank, a second frustoconical section directly adjacent to said first frustoconical section, and a third frustoconical section directly adjacent to said second frustoconical section;
   said first frustoconical section having a smallest diameter $D_2$ adjacent to said shank wherein $D_2 < D$, said first frustoconical section having a largest diameter $D_3$ wherein $D_3 > D_2$ and $D_3 < D$;
   said second frustoconical section having a smallest diameter $D_4$ adjacent to said first frustoconical section wherein $D_4 = D_3$, said second frustoconical section having a largest diameter $D_5$ wherein $D_5 > D$, said second frustoconical section having a first lateral surface wherein a first angle defined between said longitudinal axis and said first lateral surface is between approximately 7.5° and approximately 22.5°; and
   said third frustoconical section having a smallest diameter $D_6$ adjacent to said second frustoconical section wherein $D_6 = D_5$, said third frustoconical section having a largest diameter $D_7$ wherein $D_7 > D_6$, said third frustoconical section having a second lateral surface wherein a second angle defined between said longitudinal axis and said second lateral surface is less than said first angle and is between approximately 5° and approximately 7.5°, wherein, when said one-piece plug structure is positioned with said first frustoconical section and a portion of said second frustoconical section in said hole, said first lateral surface area contacts said material at said hole.

4. A friction pull plug and material configuration as in claim 3, wherein said first angle is approximately 20° and wherein said second angle is approximately 6.5°.

5. A friction pull plug and material configuration for an anti-chatter friction pull plug weld, comprising:
- a material having a hole therein wherein said hole has a diameter D;
- a one-piece plug structure including a cylindrical shank and a series of three frustoconical sections wherein a common longitudinal axis extends through said cylindrical shank and said series of three frustoconical sections;
- said shank having a constant diameter $D_1$ wherein $D_1<D$;
- said series of three frustoconical sections defined by steadily increasing diametric measurements;
- said series of three frustoconical sections having a first frustoconical section directly adjacent to said cylindrical shank, a second frustoconical section directly adjacent to said first frustoconical section, and a third frustoconical section directly adjacent to said second frustoconical section;
- said first frustoconical section having a smallest diameter $D_2$ adjacent to said cylindrical shank wherein $D_2<D$, said first frustoconical section having a largest diameter $D_3$ wherein $D_3>D_2$ and $D_3<D$;
- said second frustoconical section having a smallest diameter $D_4$ adjacent to said first frustoconical section wherein $D_4=D_3$, said second frustoconical section having a largest diameter $D_5$ wherein $D_5>D$, said second frustoconical section having a first lateral surface wherein a first angle defined between said longitudinal axis and said first lateral surface is between approximately 7.5° and approximately 22.5°; and
- said third frustoconical section having a smallest diameter $D_6$ adjacent to said second frustoconical section wherein $D_6=D_5$, said third frustoconical section having a largest diameter $D_7$ wherein $D_7>D_6$, said third frustoconical section having a second lateral surface wherein a second angle defined between said longitudinal axis and said second lateral surface is less than said first angle and is between approximately 5° and approximately 7.5°, wherein, when said one-piece plug structure is positioned with said first frustoconical section and a portion of said second frustoconical section in said hole, said first lateral surface area contacts said material at said hole.

6. A friction pull plug and material configuration as in claim 5, wherein said first angle is approximately 20° and wherein said second angle is approximately 6.5°.

* * * * *